United States Patent [19]

Walker et al.

[11] 3,886,590

[45] May 27, 1975

[54] MULTI-MESSAGE ANNOUNCING SYSTEM

[75] Inventors: Walter P. Walker, Atlanta; Leary W. Smith, Chamblee; Frank H. Cofer, Jr.; Jack E. Lewis, both of Atlanta, all of Ga.

[73] Assignee: The Audichron Company, Atlanta, Ga.

[22] Filed: Sept. 11, 1973

[21] Appl. No.: 396,155

Related U.S. Application Data

[63] Continuation of Ser. No. 140,195, May 4, 1971, abandoned.

[52] U.S. Cl. ............ 360/12; 179/6 C; 179/100.1 C; 360/66; 360/69; 360/72; 360/78; 360/87

[51] Int. Cl. .... G11b 5/54; G11b 5/76; G11b 19/12

[58] Field of Search ...... 179/100.1 C, 6 C, 100.3 B; 360/12, 69, 71, 72, 87, 66

[56] References Cited

UNITED STATES PATENTS

| | | | |
|---|---|---|---|
| 3,488,443 | 1/1970 | Smith | 179/6 C |
| 3,496,299 | 2/1970 | Temmer | 179/6 C |
| 3,497,223 | 2/1970 | Atkins | 179/100.1 C |
| 3,673,344 | 6/1972 | Smith et al. | 179/100.1 C |

*Primary Examiner*—Raymond F. Cardillo, Jr.

[57] ABSTRACT

An announcing system including a message drum with a plurality of listening-recording heads radially spaced around the message drum, each of the listening-recording heads being adapted to traverse a portion of the surface of the message drum, and each of the listening-recording heads having an erase head associated therewith. A master timer is provided, and synchronizing means associated with the message drum provides a synchronizing pulse to maintain proper relationship between the master timer and rotation of the message drum. A control circuit allows a recording station to be selectively connected to the listening-recording heads for recording a message on a message track of the message drum and a subscriber station to be selectively connected to the listening-recording heads for listing to a message that has been recorded on the message drum. The control circuit, under the influence of the master timer, assures that the entire message on the message track will be played each time a subscriber line is connected to the system, and that sufficient time is allowed for mechanical operations of the apparatus between each cycle of the apparatus.

10 Claims, 11 Drawing Figures

FIG. 6 (TYPICAL CHANNEL CONTROL UNIT)

FIG. 7 (FUNCTION CONTROL UNIT)

MULTIPLE-CHANNEL RECORDED MESSAGE DELIVERY SYSTEM

This is a continuation of application Ser. No. 140,195, filed May 4, 1971, now abandoned.

BACKGROUND OF THE INVENTION

This invention relates to message announcing systems, and is more particularly concerned with a message announcing system in which a plurality of messages can be recorded on a recording medium for selective playback to one or more subscribers through one or more subscriber lines either simultaneously or successively.

In the past, there have been numerous forms of announcing systems in which a subscriber can be connected to the equipment through telephone lines or other convenient means and can receive a recorded message that has been previously recorded on a recording medium of the announcing system.

The announcing systems have normally taken the form of a recording medium having basically a single message recorded thereon, though some systems have included means by which there can be a variable portion of the recorded message so that constantly varying information such as time, temperature or the like can be given to the subscriber along with a fixed message such as an advertising message.

One difficulty with the announcing systems of the prior art is that, unless a large number of machines is made available with exactly the same information, a subscriber who attempts to contact the announcing machines may have a relatively long wait due to the machine's being busy delivering its message to another subscriber. Also, there has normally been no facility by which a plurality of entirely different messages could be placed on one announcing machine; thus, if advertising is to be sold to several different businesses, even though the same information is to be given to the subscribers in conjunction with each advertisment, there must be a separate announcing machine for each of the advertisements to be sold.

Prior art announcing machines have, in general, lacked the desired versatility as they are designed for a specific format of message, and the format is not changeable.

SUMMARY OF THE INVENTION

The present invention overcomes the above-mentioned and other difficulties with the prior art announcing machines by providing a single recording medium having a plurality of listening-recording heads associated therewith, each of the plurality of listening-recording heads being independently selectable so that each listening-recording head can provide a subscriber service that is completely independent of all of the other listening-recording heads; or, each listening-recording head can be arranged to respond to the same subscriber line so that a plurality of different subscriber lines can be connected to the same announcing machine at the same time thereby to reduce the waiting time of a subscriber when he attempts to contact the machine.

The single recording medium is effectively divided into a plurality of message tracks with each of the plurality of listening-recording heads associated with one of the message tracks. The listening-recording heads are, then, selectively movable towards and away from the recording medium so that the listening-recording head can be operative or inoperative on command of the control circuits for the announcing machine.

Synchronizing means is provided so that, even though the listening-recording heads are arranged radially around the recording medium, an individual listening-recording head will become operative with respect to its particular message track only at the beginning of that message track. Thus, in no case will a subscriber be connected to the announcing machine and begin to receive the recorded message at any point other than the very beginning of that recorded message.

It will also be seen that, due to the fact that there is a plurality of listening-recording heads, each being associated with a paticular message track on a single recording medium, the control for the announcing system can be arranged so that the separate message tracks can be simply segments of a longer message.

Of course, the obvious use of the multi-message announcing machine according to the present invention is to provide a separate message on each of the message tracks and to have each of the listening-recording heads connectable to a separate trunk line or the like so that a subscriber can be connected to a given trunk line to receive a given message. With this arrangement 12 different messages can be provided, and these 12 different messages can be 12 different advertisements with a particular piece of information following the advertisement, or it can be any such thing as a daily horoscope for each of the 12 signs of the zodiac.

Numerous other features and advantages of the present invention will become apparent from consideration of the following specification when taken in conjunction with the accompanying drawings.

DESCRIPTION OF A PREFERRED EMBODIMENT

In general terms, the apparatus of the present invention includes a message drum that is cylindrical and is mounted with its central axis vertically disposed for rotation about the axis. Circumferentially disposed around the message drum is a plurality of listening-recording heads that are selectively engagable with selected portions of the drum to enable a person to record a message on a particular portion, or message track, of the drum, or to allow a person to listen to a message that had been previously recorded on the drum.

Figure 1:
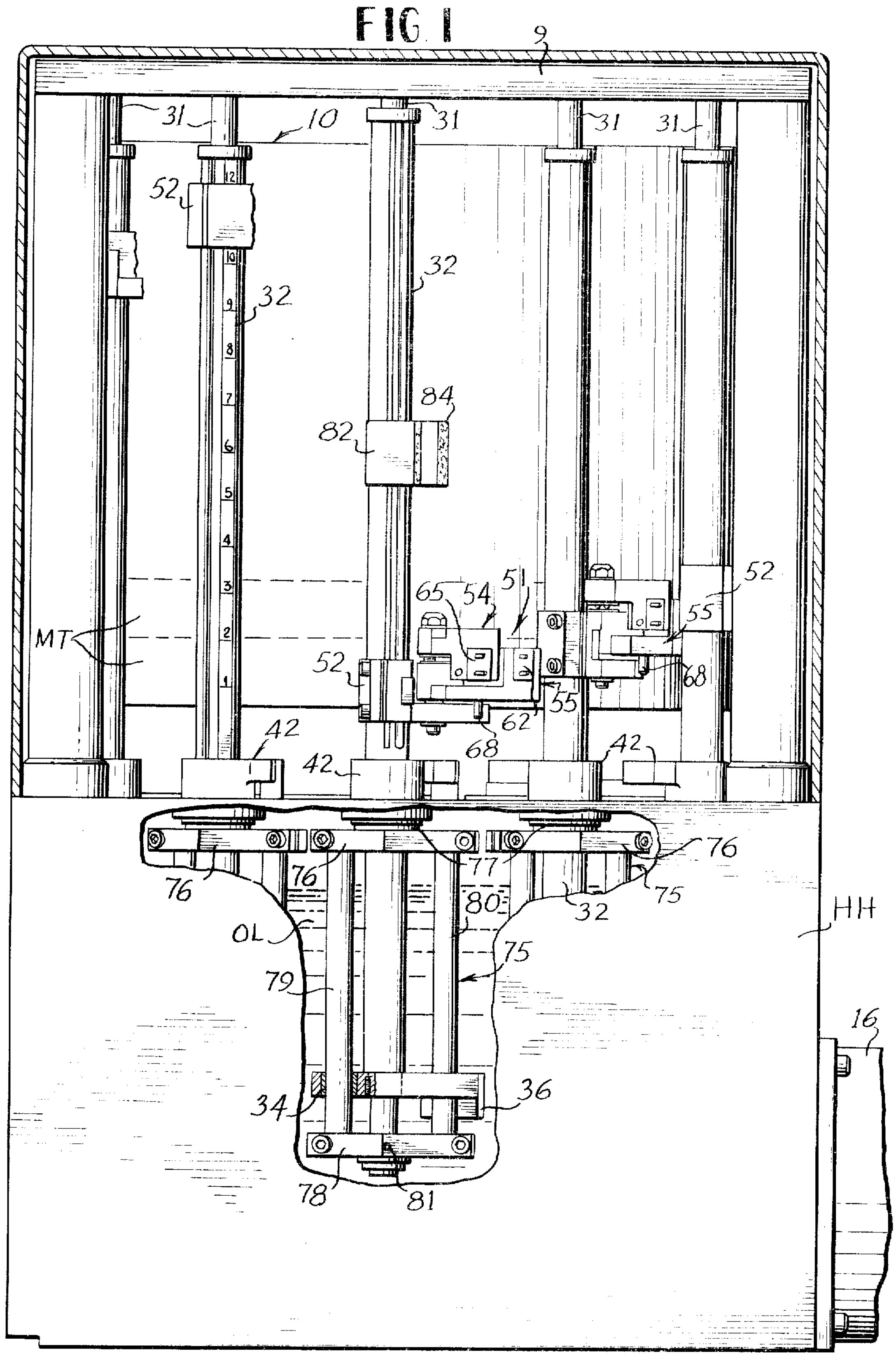
FIG. 1 is a side elevational view, partially broken away, showing a multi-message announcing system made in accordance with the present invention.
Figure 2:
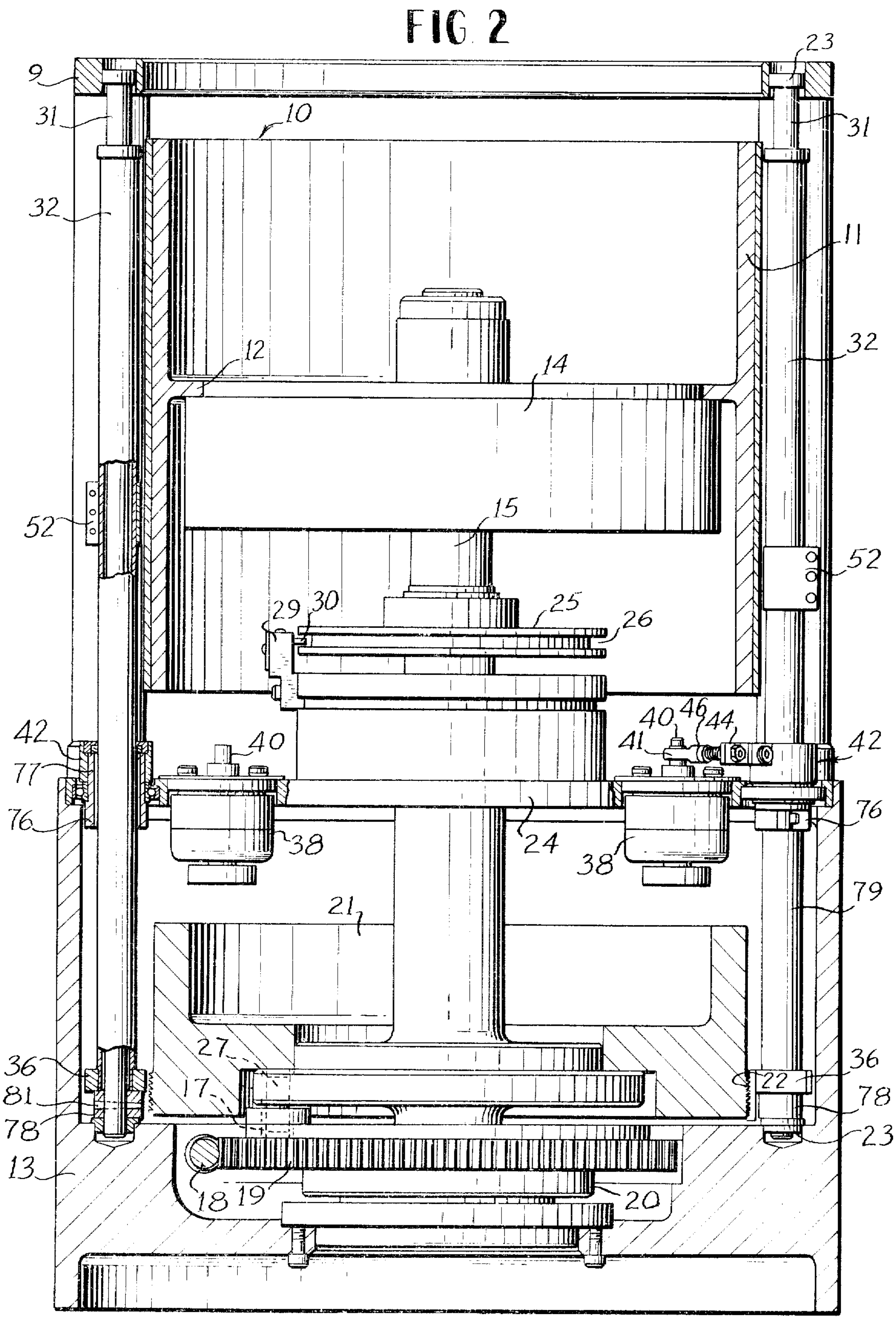
FIG. 2 is a transverse cross-sectional view of the machine shown in FIG. 1.

Referring now particularly to FIGS. 1 and 2 of the drawings, it will be seen that the message drum 10 is cylindrical in shape having a cylindrical wall 11, the outside of which is coated with a magnetically responsive material to provide a recording medium. Within the drum there is a substantially centrally disposed web 12 that projects radially inwardly to provide a mounting flange for the drum 10.

The mounting flange 12 is supported by a wheel 14 that is, in turn, carried by a drive spindle 15. The drive spindle 15 is appropriately mounted for rotation as will be discussed shortly.

To rotate the drive spindle 15, there is a drive motor 16 shown partially broken away in FIG. 1, the drive motor 16 having a worm 18 attached to its spindle to be driven thereby. The worm 18 meshes with and drives a worm gear 19, the worm gear 19 being fixed to a rotatable drive assembly 20 which is appropriately mounted for rotation on bearings (not shown). The drive spindle 15 and its appurtenances are rotatably mounted by suitable bearings (not shown) which are separate from those on which the drive assembly 20 is mounted. The drive spindle 15 is driven by the drive assembly 20 through pins 27 which extend into vibration absorbent bushings 17 positioned in the drive assembly 20. The vibration absorbent bushing 17 prevent vibrations of the drive assembly 20 from being transmitted to the drive spindle 15.

Immediately above the support assembly 20 there is a drive wheel 21 that is mounted concentric with the drive spindle 15 and is fixed for rotation therewith. The outer cylindrical surface of the drive wheel 21 is provided with a threaded portion 22 the purpose of which will be discussed hereinafter.

Between the drive wheel 21 and the support 14, the drive spindle 15 is journaled in an intermediate bracket 24; and, immediately above the bracket 24, there is a timing wheel 25. The timing wheel 25 is of a disk-like configuration having a peripheral groove 26. As is better shown in FIG. 3 of the drawings, a portion of the periphery of the timing wheel 25 is cut away for the receipt of a permanent magnet 28, the magnet 28 simply replacing that portion of the periphery of the timing wheel 25 and re-establishing the exact configuration of timing wheel 25.

Carried by the central bracket 24 is a switch bracket 29, the switch bracket 29 being fixed to the bracket 24 and carrying a magnetically responsive switch 30.

Though there are numerous forms of magnetically responsive switches, and substantially any of such switches may be used in the apparatus here disclosed, it has been found quite convenient to use what is commonly known as the Hall effect switch. Those skilled in the art understand the construction and operation of a Hall effect switch so it should suffice to point out that the hall effect switch is arranged so that, as a magnetic field is passed over the Hall effect switch, a voltage is induced in a conductor that is within the switch, and this voltage is amplified by an amplifier that is also built into the switch. This amplified voltage then can be used as a control pulse for various conventional electronic equipment.

The timing wheel 25 with its magnet 28, in conjunction with the magnetically responsive switch 30 comprise the synchronizing means which provides the necessary information as to the position of the message drum 10 with respect to the listening-recording heads. Since the object of the switch 30 is to indicate the rotational position of the drum 10, the switch will hereinafter be referred to as the drum switch 30.

It will now be seen that, as described so far, the apparatus includes a drive means to cause rotation of a drive spindle 15 and a drive wheel 21 which will in turn cause rotation of a message drum 10 that is carried by the drive spindle 15, and a timing wheel 25 that is also carried by the drive spindle 15. Due to the placement of permanent magnet 28 within the timing wheel 25 and the proximate disposition of the drum switch 30, a pulse will be generated one time for each complete revolution of the timing wheel 25, hence of the spindle 15 and the other described apparatus carried by the spindle 15.

Next, it will be seen that there is a plurality of mounting posts 31 equally spaced radially around the message drum 10 and parallel to the axis of the drum 10. It will be seen that each of the posts 31 is mounted between the base 13 and the top plate 9 of the frame of the device, each end being appropriately journaled in bearings 23.

Each of these posts 31 has surrounding it a sleeve 32, the sleeve 32 having appropriate journaling 34 at its lower end and appropriate journaling (not shown) at its upper end; and, it will be understood that the sleeve 32 is sufficiently larger than the post 31 that the sleeve 32 can reciprocate axially along the post 31. At the lowermost end of the sleeve 32, there is a half-nut 36 that is adjacent to the threaded portion 22 on the drive wheel 21. Normally, as shown in the drawings, the half-nut 36 is not in engagement with the threaded portion 22 of the drive wheel 21, but if the sleeve 32 is rotated, thereby rotating the half-nut 36, the half-nut 36 will become engaged with the threaded portion 22 of the drive wheel 21 so that, as the drive wheel 21 rotates, the half-nut 36 will move along the threaded portion 22. Since the half-nut 36 is fixed to the sleeve 32 it will be seen that, as the half-nut 36 rides up along the threaded portion 22, the sleeve 32 will likewise be moved vertically, sliding along the post 31. It will also be seen that when the sleeve 32 is subsequently rotated so that the half-nut 36 does not engage the threaded portion 22 of the drive wheel 21, the sleeve 32 will fall by gravity to its lowermost position.

To cause the necessary rotation of the sleeve 32 in order to engage the half-nut 36 with the threaded portion 22 of the drive wheel 21, it will be seen that there is a rotary solenoid 38 in conjunction with each of the posts 31 and sleeves 32. Thus, the rotary solenoids 38 are radially spaced around the apparatus and are carried by the central support 24.

Figure 3:
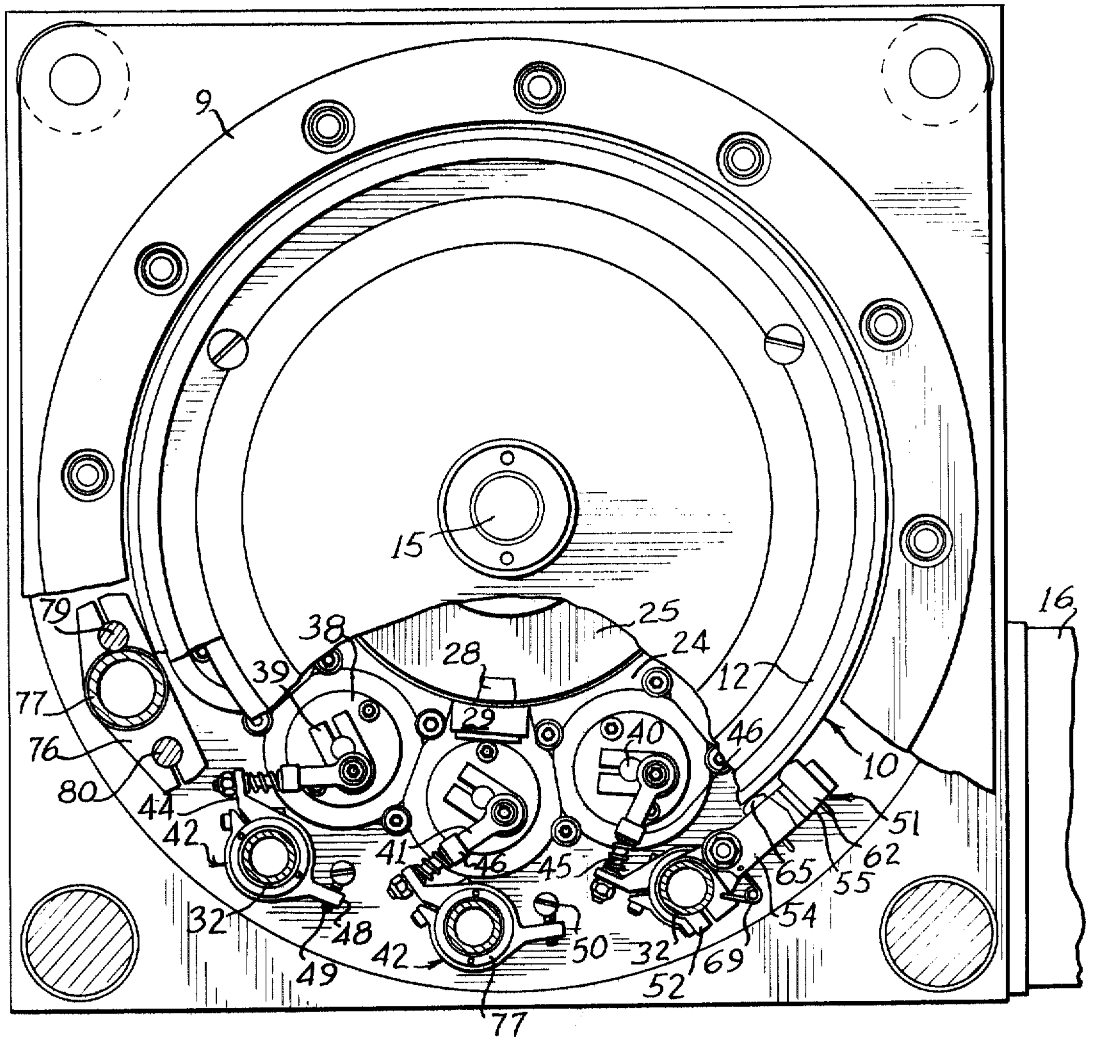
FIG. 3 is a top plan view, partially broken away, of the announcing machine shown in FIGS. 1 and 2.

As best seen in FIG. 3 of the drawings, the rotary solenoid 38 has a crank 39 fixed to the shaft 40 of the solenoid; and, a link 41 is pivotally connected to the crank 39. The link 41 is, in turn, connected to a bell crank 42, and the bell crank 42 is clamped to a hub 77 which extends from a collar 76. As will be described below, rotation of the collar 76 will cause rotation of the sleeve 32. Thus, as the bell crank 42 is rotated through the link 41, the sleeve 32 will also be rotated. The bell crank 42 has one of its arms 44 arranged to receive the link 41 therethrough with a spring 45 between the arm 44 of the bell crank and a collar 46 that is on the link 41. With this arrangement it will be seen that, as the solenoid 38 causes the crank 39 to rotate and urge the link 41 towards the arm 44 of the bell crank 42, the spring 45 will be compressed to provide a constant force against the arm 44 of the bell crank 42.

The opposite arm 48 of the bell crank 42 has a set screw 49 that will bear against a stop member 50 to limit the counterclockwise (as viewed in FIG. 3) rotation of the bell crank 42.

It will now be seen that, with the above described apparatus, there is provided a means to cause rotation of the sleeve 32 so that the half-nut 36 will engage the threaded portion 22 of the drive wheel 21 and, with rotation of the drive wheel 21, the half-nut 36 will move up with respect to the threaded portion 22 of the drive wheel 21 to cause the sleeve 32 to move vertically along the post 31. This mechanical motion is to control the engagement and disengagement, as well as the recording-playback motion of the listening-recording heads to be described shortly.

Looking again at FIG. 1 of the drawings, it will be seen that each of the sleeves 32 has mounted thereon a head assembly 51; and, the successive head assemblies 51 are vertically stepped with respect to the preceding head assemblies 51 so that, around the entire drum 10 there is a plurality of head assemblies 51, each head assembly having a particular segment, or message track, of the drum 10 that it will traverse during the above described operation.

Figure 4:
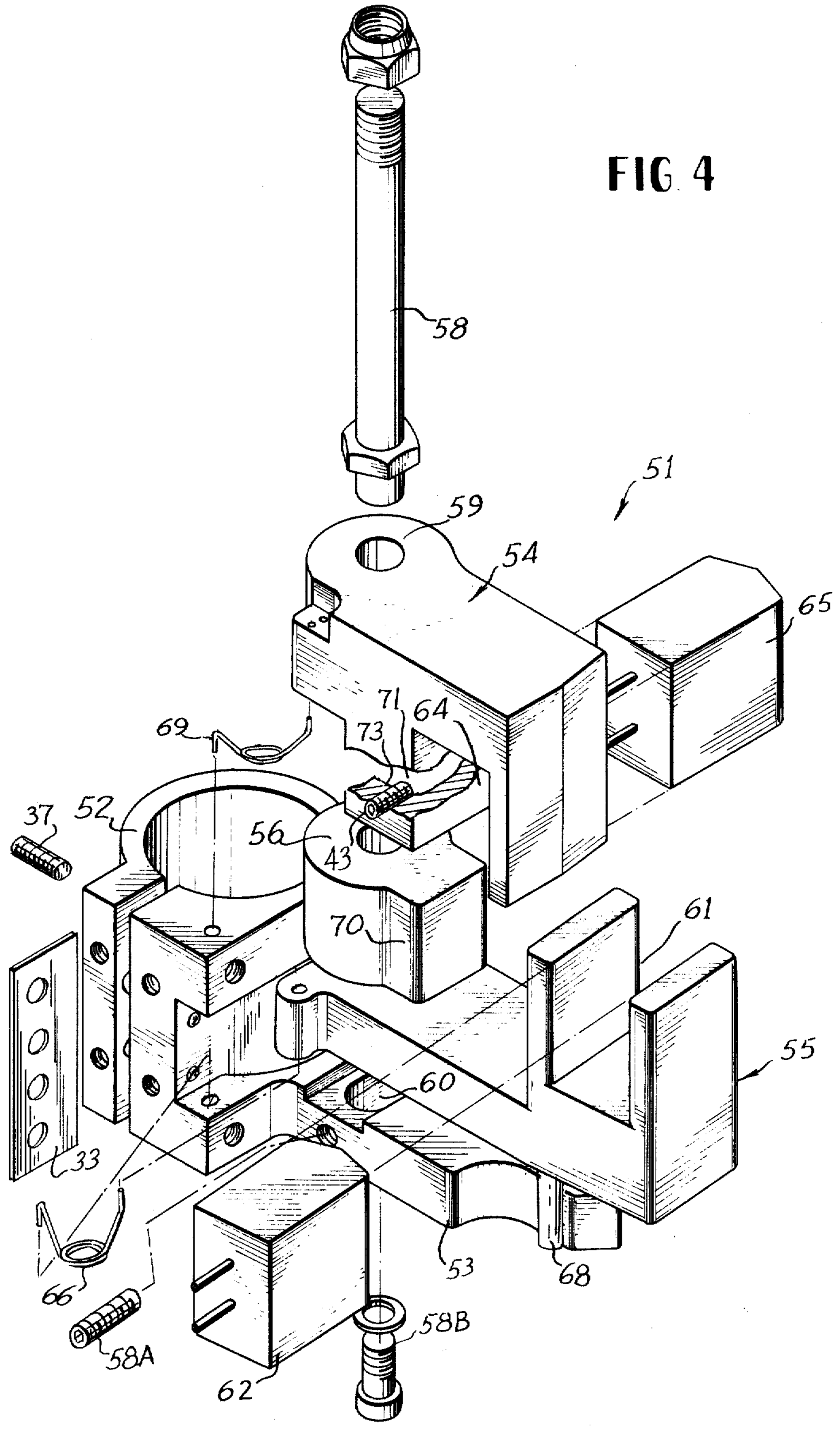
FIG. 4 is an exploded perspective view showing the head assembly for use on the machine shown in FIG. 1; and, FIGS. 5 through 11 are schematic representations of various aspects of the electronic control circuit used in conjunction with the multi-message announcing system shown in FIGS. 1 through 5.

The head assembly 51 is shown in detail in FIG. 4 of the drawings where it will be seen that there is a collar 52 adapted to be received on the sleeve 32 for rotation therewith. The collar 52 carries an outwardly extending arm 53 to which the erase head arm 54 and the listening-recording head arm 55 are pivoted. The listening-recording head arm 55 has a bearing 56 at its innermost end to receive a pivot pin 58. Similarly, the erase head arm 54 has a bearing 59 at its innermost end to receive the pivot pin 58. It will now be seen that the pivot pin 58 passes through the hole 60 in the arm 53 where it is fixedly, but adjustably, positioned, by set screw 58A and adjustment screw 58B. The pivot pin 58 also passes through the bearings 56 and 59 in the arms 55 and 54 respectively. However, it will be understood that the arms 55 and 54 will pivot with respect to the arm 53.

On the outer end of the arm 55, there is a mount 61 to receive the listening-recording head 62, the listening-recording head 62 being secured within the mount 61 by any conventional means. Similarly, the arm 54 has a mount 64 to receive the erase head 65 which is to be secured within the mount 64 by any conventional means.

Thus far, it will be seen that there is provided an arm 55 to carry a listening-recording head 62 and the arm 55 is pivotable with respect to the mounting arm 53. A spring 66 is connected between the collar 52 and the arm 55 to urge the arm 55 towards the drum 10, which is in a counterclockwise direction as viewed in FIG. 3 of the drawings. Also, a pin 68 projects from the bottom of the arm 55 to act against the outermost portion of the arm 53 as a limit in the counterclockwise direction.

Similarly, the erasing head 65 is mounted within the arm 54 pivotable with respect to the arm 53 and with respect to the arm 55. A spring 69 is connected between the arm 54 and the collar 52 so that the arm 54 is spring urged towards the drum 10 in the same direction as is the arm 55. It will be seen that the bearing 56 on the arm 55 has an outward projection 70 that is received within a cutout portion 71 on the arm 54. When an adjustment screw 43 extending frothe wall 73 of the cutout portion 71 strikes the projecting portion 70 of the bearing 56, the counterclockwise rotation of the arm 54 will be terminated.

It will thus be seen that the assembly 51 provides mounting means for both a listening-recording head 62 and an erase head 65, each of the heads being independently spring urged against the drum 10, and both having stop means to prevent undue rotation of the heads 62 and 65 with respect to the collar 52. It will also be seen that the assembly 51 places the heads 62 and 65 in the same plane of motion perpendicular to the axis of rotation of the drum while at the same time providing for their independent motion relative to the surface of the drum.

Since the collar 52 is fixed by clamping means 37 and key 33 to the sleeve 32, it will be seen that, when the sleeve 32 is rotated clockwise as viewed in FIG. 3, the arm 53 will be rotated clockwise and will engage the pin 68 to cause the arm 55 to rotate away from the drum 10. As this happens, the projecting portion 70 of the bearing 56 will engage the adjustment screw 43 extending from the wall 73 of the arm 54 to cause the arm 54 also to rotate away from the drum 10. Removal of both heads 62 and 65 from the drum 10 is therefore assured.

Referring again to FIGS. 1 and 2 of the drawings, it will be seen that, at the lower end of each of the sleeves 32 there is a slide assembly generally designated as 75. This slide assembly includes upper and lower collars 76 and 78 respectively and support posts 79 and 80 extending therebetween parallel to the sleeve 32. The sleeve 32 passes through, but does not engage, upper collar 76 so that the sleeve 32 can move vertically with respect to the upper collar 76. The collar 78 is below the lowest extremity of the sleeve 32 and is fixed to the post 31 by means of a pin 81. The half-nut 36 is fixed to the lower end of the sleeve 32 as previously described, and extends in one direction to be journaled around the rod 79, and extends in the other direction to be journaled around the rod 80. This arrangement gives stability to the mounting of the sleeve 32 and provides sufficient rotational force to cause the half-nut 36 to remain in engagement with the threaded portion 22 of the drive wheel 21 when desired. It will be seen from the foregoing that, when the solenoid 38 is energized to cause the bell crank 42 to rotate, the resulting rotation of the collar 76 will cause rotation of the entire assembly 75. The half-nut 36 will be rotated due to the rotation of the support posts 79 and 80 and will be firmly urged toward the threaded portion 22 of the drive wheel 21.

The solenoid 38 is a spring return solenoid and when the solenoid 38 is de-energized, the entire assembly 75 rotates to move the half-nut 36 away from the threaded portion of the drive wheel 22. When this occurs, the sleeve 32, the heads 62 and 65, and the pad 84 drop by gravity. Oil OL is placed in the housing HH at a level which immerses the collar 78 and the half-nut 36. Thus, as the sleeve 32 falls by gravity, the oil OL serves to dampen the return of the sleeve 32 and heads 62 and 65 to their lowermost positions.

It will be understood by those skilled in the art that, in apparatus of the type disclosed herein, it is customary to place a lubricant on the surface of the recording drum to reduce the wear of the heads 62 and 65 while the heads 62 and 65 are in contact with the surface of the drum 10. Since the drum in the present device is mounted so that its axis is vertically disposed, it will be seen that any lubricant placed on the surface would tend to run down by gravity and either collect at the lowermost edge of the drum or to drip therefrom. To prevent this undesirable displacement of the lubricant, there is a wick mounted on each of the sleeves 32. There is simply a spring bracket 82 clipped on to the sleeve 32, and the bracket 82 carries a pad 84 of felt or other absorbent material. When the sleeve 32 is rotated to cause the head assembly 51 to engage the drum 10, the pad 84 will also engage the drum 10 and absorb any lubricant that is running towards the bottom of the drum. The pad 84 will redistribute the lubricant over the surface of the drum as the drum rotates and the pad 84 moves upwardly with the sleeve 32.

In the above discussion, only one of the assemblies including the post 31 and its associated sleeve 32 has been described; however, it will be seen from the drawings that there is a plurality of such assemblies and all of such assemblies are substantially identical. For this reason the same reference numerals are applied to the particular parts in all of the various assemblies. For purposes of the particular embodiment here chosen by way of illustration, it will be understood that there are 12 such assemblies distributed equally around the message drum 10 and having their heads 62 and 65 positioned on their sleeves 32 so that the heads 62 and 65 are progressively displaced from preceding heads 62 and 65 along the axis of rotation of the drum. However, it will be readily understood after consideration of the following discussion of the control means that substantially any positions of the heads 62 and 65 and any number of such assemblies could be used with only minor modification that would be well within the scope of the person skilled in the art.

For example, the heads 62 and 65 associated with the sleeves 32 can be positioned along the sleeves 32 so that all of the heads 62 and 65 are in substantially the same plane of reference perpendicular to the axis of rotation of the drum. This would cause all of the heads 62 and 65 to be associated with the same message track MT and as will be apparent from the description to follow, it would permit the same message to be provided a plurality of times during one revolution of the drum.

As will also be apparent from the description to follow, the pairs of heads 62 and 65 associated with the sleeves 32 may be made operative in any sequence including simultaneously. However, if pairs of heads 62 and 65 are to be made operative simultaneously or in a sequence which does not place the beginning of the threaded portion 22 of the drive wheel 21 in the proper positions to be engaged by all appropriate half-nuts 36, multiple leads or threads on the threaded portion 22 and some half-nuts 36, or other similar modifications, will be necessary. It is obvious that making two or more pairs of heads 62 and 65 simultaneously operative will permit different messages to be simultaneously provided.

It will be apparent from the description above, that if a modification is such that a smaller number of listening-recording heads 62 are used, the message tracks MT can be wider than here shown. The threaded portion 22 of the drive wheel 21 would be longer so that the total upward travel of the sleeve 32 would be sufficient to cover the entire message track. Conversely, if a greater number of listening-recording heads are used, the message tracks MT would be smaller, and other changes made accordingly.

From the above description of the apparatus of the multi-message announcing system disclosed herein, it will now be understood that the apparatus provides a plurality of message tracks MT and a plurality of listening-recording heads 62 which are selectively positionable relative to the plurality of message tracks for recording or listening to a plurality of messages. It will also be understood that the apparatus includes an erasing head 65 associated with each of the plurality of message tracks and that the erasing head 65 and the listening-recording head 62 associated with each of a plurality of message tracks are positioned relative to the message track by a head positioning solenoid 38.

Whether a particular listening-recording head 62 positioned against the drum is to record or listen to a message, and whether a particular erasing head 65 is energized or not are dependent upon the various modes of operation of the multi-message announcing system. The various modes of operation of the multi-message announcing system will be better understood after a consideration of FIG. 5 from which it will be seen that there is a channel control unit U for each of the plurality of message tracks.

Each channel control unit U serves to connect a trunk C to a connector Y and a listening-recording head 62 for the recording of a message on a message track when the trunk C is connected by central office equipment 90 to a recording line B. Similarly, each channel control unit U serves to connect a connector R and a listening-recording head 62 to a trunk E for listening to a message on a message track when the trunk E is connected by the central office equipment 90 to one or more of a plurality of subscriber lines A. The subscriber lines A and the recording line B are conventional telephone lines by which messages may be transmitted to or received from a conventional telephone station ST when the telephone line is made operative by the operation of a cradle or other switch Z at the station ST. Similarly, the central office equipment 90 is conventional telephone equipment by which telephone lines such as the subscriber lines A and the recording line B are connected to other telephone lines or to trunks such as trunks C and D.

In the embodiment of the invention disclosed herein, the central office equipment 90 is arranged to connect the recording line B to the trunk C whenever and as long as the recording line B is made operative by the switch Z. However, a subscriber line A is connected by the central office equipment 90 to the trunk E only when the subscriber line A is made operative by the operation of a switch Z and only in response to a CT pulse provided from the channel control unit U to the central office equipment 90 by the trunk G. An operative subscriber line A is disconnected by the central office equipment 90 from the trunk E when the subscriber line A is made inoperative by operation of a switch Z or in response to a CO pulse provided from the channel control unit U to the central office equipment 90 by the trunk H.

A channel control unit U not only provides CT and CO pulses to the central office equipment 90, but it also provides the CT and CO pulses at such times as to cause the central office equipment 90 to connect one or more operative subscriber lines A to a trunk E at the beginning of a message on a message track and to disconnect the subscriber lines A from the trunk E at the end of the message. Each channel control unit U also provides a busy signal to the central office equipment 90 by the trunk D.

This busy signal is in response to the recording line B being connected to the trunk C by the central office equipment 90 and serves to prevent the central office equipment 90 from connecting subscriber lines A to the trunk E. It also causes the central office equipment 90 to provide a busy signal to operative subscriber lines A whenever the trunk C has been connected by the central office equipment 90 to a recording line B. Thus, since a recording line B is used to change the message on a message track, a channel control unit U serves to prevent subscriber lines A from being connected to the trunk E while the recording line B is being used to change the message on a message track.

Figure 5:
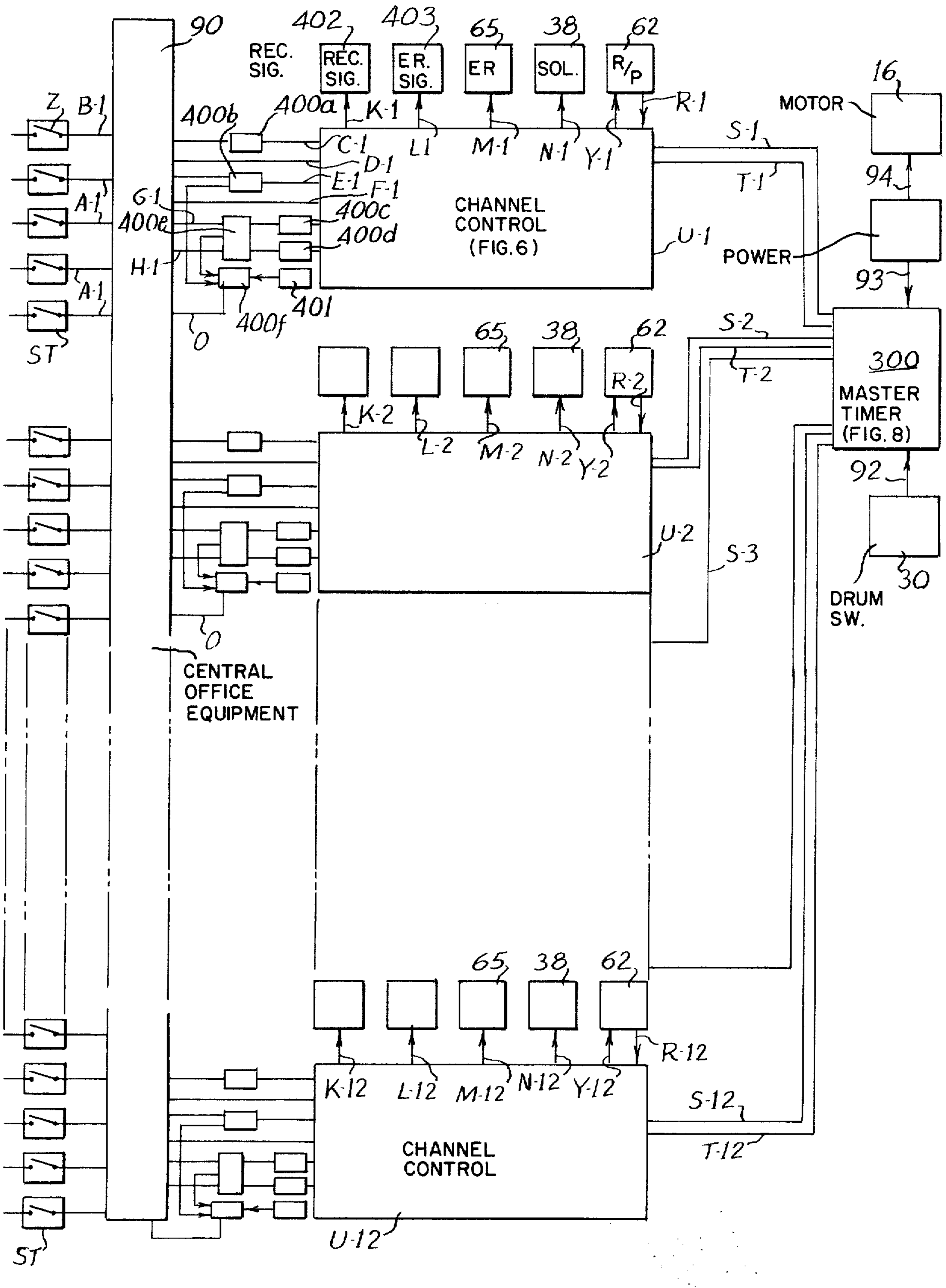

To provide for the monitoring of the various modes of operation of the multi-message announcing system, the system includes various signal devices and alarms as shown in FIG. 5. For example, a signal device **400*a* is operatively placed in each trunk C to provide an auditory, visual, or other type of indication that the trunk C has been connected by the central office equipment 90 to a recording line B. Similarly, a signal device 400*b*** is operatively placed in each trunk E to provide an auditory, visual or other indication of a continuing absence of a message on trunk E for a predetermined interval of time which is indicative of there being no message on the message track or of some malfunction of the multi-message announcing system which causes no message to be provided to subscriber lines A over the trunk E.

A signal device **400*c* is operatively placed in each trunk G to provide an auditory, visual or other indication of each CT pulse from a channel control unit U to the central office equipment 90. Further, a signal device 400*d* is operatively placed in each trunk H to provide an auditory, visual or other indication of each CO pulse from a channel control unit U to the central office eqeuipment 90. A signal device 400*e*** is operatively placed in both trunks G and H to provide an auditory, visual or other indication of a continuing absence of CT or CO pulses for a predetermined interval of time selected to be indicative of some malfunction of the multi-message announcing system.

The signal device **400*b* and the signal device 400*e* each provide a signal input to an alarm device 400*f* which in response to a signal input from either the signal device 400*b* or the signal device 400*e* provides an alarm signal and an out-of-service input by a trunk O to the central office equipment 90. The alarm signal causes a visual or auditory alarm which is adequate to attract the attention of repair personnel. A manual switch 401 is operative to terminate the alarm signal while continuing the out-of-service input to the central office equipment 90.**

The out-of-service input to the central office equipment 90 by the trunk 0 causes the central office equipment 90 to provide a busy signal to operative subscriber lines A and to otherwise prevent the subscriber lines A from being connected by a channel control unit U to a listening-recording head 62 when the multi-message announcing system is for some reason not operating properly. However, the out-of-service input to the central office equipment 90 by the trunk O does not prevent the recording line B from being connected to the trunk C since the out-of-service input may be caused by the absence of a message on a message track and since the connecting of the recording line B to the trunk C may be necessary to correct this condition. The signal devices 400 and the manual switch 401 are shown only as blocks in FIG. 5 because they may each be any conventional device which will be apparent to those skilled in the art once the function of each is understood.

Each channel control unit U is responsive to a master timer 300 which is in turn responsive to an input by connector 92 from the drum switch. As shown in FIG. 5, the master timer 300 provides an input by a connector S to each channel control unit U and an input by a connector T to each channel control unit U. The input by a connector T from the master timer 300 to each channel control unit U is a series of clock pulses P-1 which provide a reference frequency having a waveform similar to W-1 in FIG. 11. Each of the clock pulses P-1 is simultaneously provided to all of the channel control units U.

Figure 11:
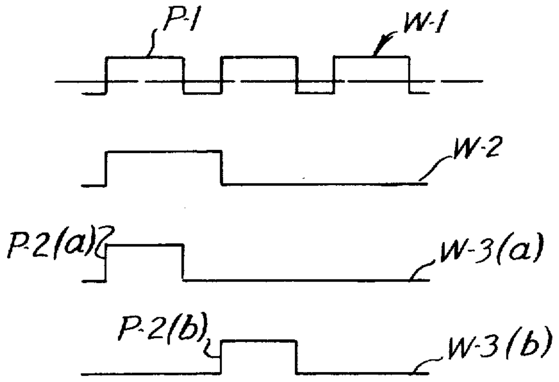

The input by connector S to each channel control unit U from the master timer 300 is a synchronizing pulse P-2 which has a waveform similar to the waveforms W-3 in FIG. 11. The synchronizing pulses P-2 serve to coordinate each channel control unit U with other channel control units U so as to provide a multi-message announcing system having a great variety of applications. This will be better understood from the following detailed consideration of a channel control unit U and the master timer 300.

CHANNEL CONTROL UNIT

Figure 6:
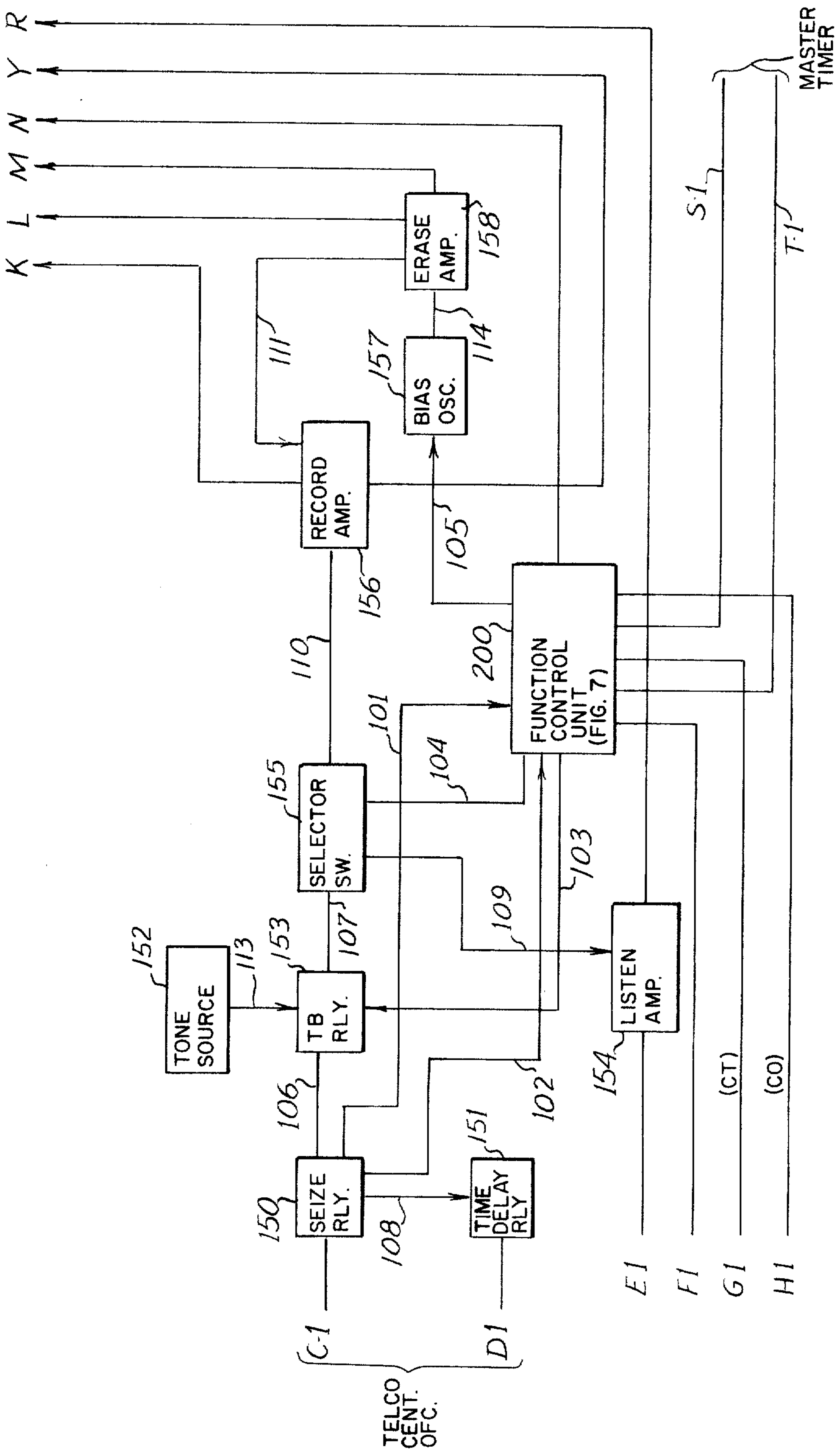

Although it will be understood from the description of the apparatus that there are 12 channel control units U in that embodiment of the invention disclosed herein, each of the channel control units U is substantially identical to other channel control units U and, as a result, FIG. 6 shows only one channel control unit U. From FIG. 6, it will be seen that each channel control unit U includes a function control unit 200 and that the clock pulses P-1 and the synchronizing pulse P-2 from the master timer 300 are inputs to the function control unit 200. It will also be seen that the function control unit 200 provides the CT pulse to the trunk G and the CO pulse to the connector H.

Further it will be seen from FIG. 6 that the channel control unit U includes a listening amplifier 154 between the trunk E and the connector R for amplifying the message on a message track as the message track is traversed by a listening-recording head 62. Thus, it will be understood from FIG. 6 that a channel control unit U provides a listening cycle which is in response to the clock pulses P-1 and synchronizing pulse P-2 from the master timer 300. During the listening cycle, the channel control unit U serves to provide CT and CO pulses by connectors G and H respectively to the central office equipment 90 and to connect operative subscriber lines A by the trunk E, the listening amplifier 154, and the connector R to a listening-recording head. The channel control unit U also serves to control a head positioning solenoid 38 by a connector N so that the listening-recording head 62 is properly positioned to respond to the message on a message track between the CT and CO pulses.

The channel control unit U also provides a recording cycle and as shown in FIG. 6, a channel control unit U includes a seize relay 150 which is operative in response to the trunk C being connected by the central office equipment 90 to an operative recording line B. When the seize relay 150 becomes operative it provides an operating voltage to a time delay relay 151 by a connector 108. After the time delay relay 151 becomes operative, it immediately provides the input to the central office equipment 90 by the trunk D which causes the central office equipment 90 to provide a busy condition to all operative subscriber trunks which are waiting to be connected to the trunk E.

Although the time delay relay 151 provides this input to the central office equipment 90 as soon as the seize relay 150 becomes operative, it maintains the input to the central office equipment 90 for a predetermined interval of time subsequent to the seize relay 150 becoming inoperative upon the opening of a switch Z at a station ST. Thus, the time delay feature of the time delay relay 151 serves to permit the seize relay 150 to become momentarily inoperative when a switch Z is opened in connection with recording a message without causing the central office equipment 90 to remove the busy condition from the subscriber lines A.

The operation of the seize relay 150 also serves to connect the trunk C to a selector switch 155 through a connector 106, a TB relay 153 and a connector 107. The normal position of the selector switch 155 is such that the trunk C is further connected by the selector switch 155 and a connector 109 to the listening amplifier 154. Thus, upon the seize relay 150 becoming operative, the recording line B is connected to the listening amplifier 154 through the connector 109, the selector switch 155, the connector 107, the TB relay 153, the connector 106, the seize relay 150, the trunk C, and the central office equipment 90.

As a result, the message on the message track to which the listening-recording head is responsive may be heard through the recording line B at a station ST. However, the seize relay 150 also provides an operating voltge to the function control unit 200 by the connector 101 when it becomes operative. After the message on the message track has been heard at the station ST at least one time in its entirety, this operating voltage in combination with the clock pulses P-1 and the synchronizing pulses P-2 from the master timer 300 causes the function control unit 200 to provide an operating voltage to the selector switch 155 by a connector 104 and a voltage pulse to the TB relay 153 by a connector 103 at a time corresponding to the message starting again.

The voltage pulse from the function control unit 200 to the TB relay 153 causes the TB relay to apply an audio frequency from a tone source 152 and a connector 113 as a tone burst to the station ST by the connector 106, the seize relay 150, the trunk C, the central office equipment 90, and the recording line B. The operating voltage to the selector switch 155 from the function control unit 200 causes the selector switch 155 to disconnect the connector 107 from the connector 109 and the listening amplifier 154 and to connect connector 107 through a connector 110 to a recording amplifier 156. Thus, in response to the function control unit 200 and at the appropriate time for recording a new message on a message track, the recording line B is connected to the recording amplifier 156 and a tone burst is provided on the recording line B to indicate at the station ST that the recording line B is connected to the recording amplifier 156. Upon the recording line B being connected to the recording amplifier 156, an input is provided by a connector K from the recording amplifier 156 to a signal device 402 shown in FIG. 5 in order to cause a visual, auditory, or other indication that the channel control unit U is providing a recording cycle.

Simultaneous with the operating voltage to the selector switch 155, the function control unit 200 has provided an operating voltage to a bias oscillator 157 by a connector 105. This operating voltage causes the bias oscillator 157 to generate a bias frequency which is amplified by an erasing amplifier 158 to which the bias oscillator 157 is connected by a connector 114. In response to the bias frequency, the erasing amplifier 158 provides an erasing frequency to the erasing head 65 by connector M. This erasing frequency serves to cause the erase head 65 to erase the message on a message track. In addition, the erasing amplifier 158 provides a carrier frequency by connector 111 to the recording amplifier 156 where the carrier frequency serves as the carrier for the recording of a new message provided from recording line B. While the erasing amplifier 158 is operative to provide the erasing frequency to the erasing head 65, an input is provided by a connector L from the erasing amplifier 158 to a signal device 403 shown in FIg. 5 in order to cause a visual, auditory, or other indication that a message is being erased.

After a new message has been recorded on a message track, the momentary opening of the switch Z to cause the seize relay 150 to become momentarily inoperative will provide a reset voltage pulse from the seize relay 150 to the function control unit 200 by a connector 102. As a result of this reset voltage pulse, the operating voltage from the function control unit 200 to the selector switch 155 is terminated to cause the connector 107 to be once again connected by the selector switch 155 to the connector 109 and the listening amplifier 154.

The reset voltage pulse from the seize relay 150 to the function control unit 200 will not cause the operating voltage from the function control unit 200 to the bias oscillator 157 to terminate until an enabling voltage from the gate 272 indicates that the entire length of the message track on which the message is being recorded has been traversed by the listening-recording head 62 and erasing head 65. This insures that the message track does not include a relatively short new message and the end of the old message.

Upon the termination of the operating voltage from the function control unit 200 to the bias oscillator 157 and with the seize relay 150 still operative, the channel control unit U provides a listening cycle during which the new message on the message track may be checked by the recording line B for accuracy. If the new message is satisfactory, the opening of the switch Z and the disconnecting of the recording line B from trunk C by the central office equipment 90 will prevent the channel control unit U from initiating another recording cycle and the channel control unit U will provide repeated listening cycles. However, if the new message is not satisfactory and the recording line B remains connected by the central office equipment 90 to the trunk C because the switch Z is not opened, the entire recording cycle described above will be repeated by the channel control unit U. The features and operation of a channel control unit U will be better understood from the following more detailed description of a function control unit 200 in a channel control unit U.

FUNCTION CONTROL UNIT

Figure 7:
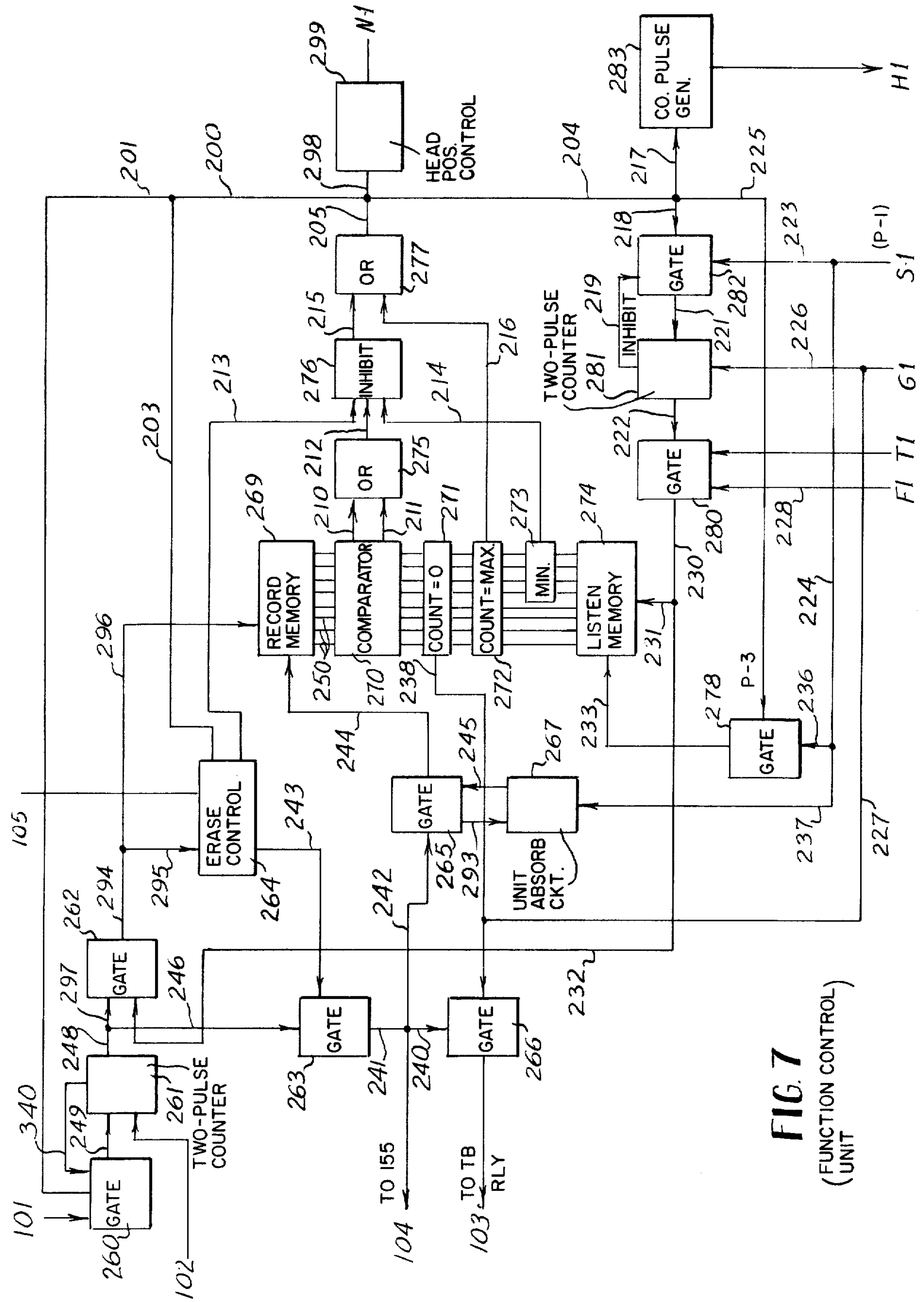

A function control unit 200 is best shown by FIG. 7 from which it will be seen that the function control unit 200 includes a first pulse counter which serves as a recording memory 269, a second pulse counter which serves as a listening memory 274, and a comparator 270 by which the pulse count in the recording memory 269 is compared with the pulse count in the listening memory 274 in conventional manner. A gate 271 is placed between the comparator 270 and the listening memory 274 and is arranged to provide a trigger pulse on a conductor 238 when the pulse count in the listening memory 274 is zero.

A gate 272 is also placed between the comparator 270 and the listening memory 274 and is arranged to provide an enabling voltage by a conductor 216 to a gate 277 when the pulse count in the listening memory 274 is at a predetermined maximum. In addition, a gate 273 is placed between the comparator 270 and the listening memory 274 and is arranged to provide an inhibiting voltage by connector 214 to gate 276 until the pulse count in the listening memory 274 is some predetermined minimum.

The comparator 270 provides an enabling voltage by a conductor 210 to the gate 275 when the pulse count of the listening memory 274 is equal to the pulse count in the recording memory 269. The comparator 270 also provides an enabling voltage by conductor 211 to the gate 275 when the pulse count in the recording memory 269 is less than the pulse count of the listening memory 274.

An enabling voltage to the gate 275 by either the connector 210 or the connector 211 from the comparator 270 causes the gate 275 to provide an enabling voltage to the gate 276 by a connector 212. The enabling voltage from the gate 275 by the connector 212 to the gate 276 causes the gate 276 to provide an enabling voltage to the gate 277 by the connector 215 unless the gate 276 is inhibited by an inhibiting voltage provided by a connector 213 as described below or by the inhibiting voltage provided by the connector 214 from the gate 273.

Figure 10:
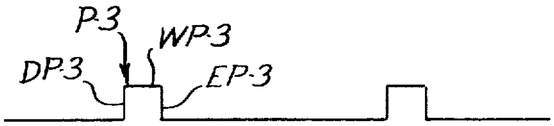

An enabling voltage to the gate 277 from the gate 276 or from the gate 272 causes the gate 277 to provide a control pulse P-3 such as is shown schematically in FIG. 10. A control pulse P-3 from the gate 277 passes by a connector 205 and a conductor 298 to a head positioning control 299.

The head positioning control 299 is connected to the head positioning solenoid 38 by the connector N and is a conventional circuit arrangement which, in response to the voltage increase provided by the leading edge of a control pulse P-3, causes the head positioning solenoid 38 to become inoperative and which, in response to the voltage decrease provided by the trailing edge of a control pulse P-3, causes the head positioning solenoid 38 to become operative. It will be recalled that when the head positioning solenoid 38 is operative, the listening-recording head 62 and the erasing head 65 are in operative position relative to the message drum 10 and that, as a result, the trailing edge of the control pulse P-3 may be considered as a head engaging voltage EP-3.

Similarly, it will be recalled that when the head positioning solenoid 38 is inoperative, the listening-recording head 62 and the erasing head 65 are in inoperative position relative to the message drum 10 and that, as a result, the leading edge of the control pulse P-3 may be considered as a head disengaging voltage DP-3. The time of occurrence of a head engaging voltage EP-3 after a head disengaging voltage DP-3 and the resulting width WP-3 of a particular control pulse P-3 between voltages DP-3 and EP-3 is dependent upon when the pulse count in the listening memory 274 is reduced so that it is no longer equal to either the pulse count in the recording memory 269 or the pulse count to which the gate 272 is responsive and so that it is no longer greater than the pulse count in the recording memory 269 if this should ever occur.

The control pulse P-3 from the gate 277 is also applied to a gate 282 by connectors 205, 204, and 218 and to a CO pulse generator 283 by connectors 205, 204, and 217. In addition, the control pulse P-3 from the gate 277 is applied to a gate 278 by connectors 205, 204, and 225.

Further features of a function control unit 200 are best understood by considering the operation of the function control unit 200 during a listening cycle by which the message on a message track is provided by the multi-message announcing system to one or more operative subscriber lines A. In considering this operation of the function control unit 200, it will be assumed that the multi-message announcing system has previously completed a listening cycle so that for reasons which will be understood from the following description, a control pulse P-3 is being applied to the gates 278 and 282. The control pulse P-3 serves as an enabling voltage for the gate 282 so that the gate 282 will provide a trigger pulse by conductor 221 to a two-pulse counter 281 when the gate 282 receives clock pulses from the master timer 300 by a connector 223 and the connector S.

The clock pulses P-1 from the master timer 300 are also applied to the gate 278 by the connector S, a connector 224, and a connector 236. However, the gate 278 is disabled to provide a voltage pulse in response to a clock pulse P-1 by the control pulse P-3. Thus, while the gate 282 is responsive to the clock pulses P-1, the gate 278 is not responsive to the clock pulses P-1.

As indicated above, during a control pulse P-3, the gate 282 provides a trigger pulse to the two-pulse counter 281 in response to the clock pulses P-1. However, the two-pulse counter 281 is a conventional two-pulse counter in that after two trigger pulses from the gate 282, the two-pulse counter 281 applies an inhibiting voltage by connector 219 to the gate 282 which prevents further trigger pulses from the gate 282 in response to clock pulses P-1. AFter the two trigger pulses from the gate 282, the two-pulse counter also applies an enabling voltage to the gate 280 by a connector 222.

It will be understood that the two-pulse counter 281 continues to provide the inhibiting voltage to the gate 282 and the enabling voltage to the gate 280 until the two-pulse counter 281 is reset by a reset pulse provided by a connector 226 as described below. The enabling voltage provided the gate 280 by the two-pulse counter 281 is one of two enabling voltages required in the function control unit 200 for a listening cycle to be initiated and this enabling voltage is provided only after two clock pulses have occurred in order to insure that a sufficient interval of time has passed since the head disengaging voltage DP-3 for the listening-recording head to have not only moved away from the message drum but to have also fallen by gravity to its lower position.

The other enabling voltage required in the function control unit 200 for a listening cycle to be initiated is provided at the gate 280 by the trunk F from the central office equipment 90 when a subscriber line A or the recording line B has been made operative by a switch Z and is ready for the recording or receiving of a message on a message track. With enabling voltages from both the two-pulse counter 281 and the trunk F, the gate 280 will provide a reset pulse by connectors 230 and 231 to the listening memory 274 in response to a synchronizing pulse P-2 provided by the connector T from the master timer 300.

As will be better understood from the description of the master timer 300 below, this start pulse occurs when the radial position of a listening-recording head 62 relative to the surface of the message drum 10 corresponds to the start of a message on a message track. Thus, the start pulse from the gate 280 corresponds to the position of the listening-recording head at which it is appropriate that a subscriber line A be connected to the listening-recording head 62.

The rest pulse from the gate 280 to the listening memory 274 causes the pulse count in the listening memory 274 to be reset to zero. The placing of the pulse count in the listening memory 274 at zero causes the gate 271 to provide a trigger pulse by the connector 238 and a connector 227 to both the connector G and the connector 226. As applied to the connector G, the trigger pulse becomes the CT pulse to which the central office equipment 90 responds by connecting one or more operative subscriber lines A to the trunk E. As applied to the connector 226, the trigger pulse from the gate 271 becomes a reset pulse for the two-pulse counter 281. The resetting of the two-pulse counter 281 removes the enabling voltage from the gate 280 so that the gate 280 is no longer responsive to a synchronizing pulse P-2 from the master timer 300. In addition, the resetting of the two-pulse counter 281 removes the inhibiting voltage from the gate 282 so that upon the next occurrence of a control pulse P-3 from the gate 277, the gate 282 will be responsive to the clock pulses P-1 from the master timer 300.

It will be understood that upon the pulse count in the listening memory 274 being reset to zero by the start pulse from the gate 280, all enabling voltages from the comparator 270 and the gates 272, 275, and 276 are terminated. Thus, the control pulse P-3 is terminated to provide a head engaging voltage DP-3 and to enable the gate 278 substantially simultaneously with the occurrence of the CT pulse. When the gate 278 is no longer disabled by the control pulse P-3, the gate 278 provides a voltage pulse to the listening memory 274 in response to each clock pulse P-1. As a result, the listening memory 274 is counting upward while the subscriber lines A are receiving the message on a message track.

When the pulse count in the listening memory 274 equals the pulse count in a recording memory 269 which, as will be explained below, corresponds to the length of the message, the comparator 270 once again provides an enabling voltage which causes the gates 275, 276 and 277 to provide a control pulse P-3. The control pulse P-3 once again provides an enabling voltage for the gate 282 so that it is responsive to clock pulses P-1. The control pulse P-3 also once again disables the gate 278 to prevent further clock pulses P-1 from causing voltage pulses to the listening memory 274.

The head disengaging voltage DP-3 in this control pulse P-3 causes the head positioning solenoid 38 to move the listening-recording head 62 away from the message drum 10 and causes the CO pulse generator 283 to provide a CO pulse to the central office equipment 90 by connector H. The CO pulse to central office equipment 90 causes the central office equipment 90 to disconnect the subscriber lines A from the trunk E and the multi-message announcing system is once again available to provide the listening cycle described above by which subscriber lines A are connected to a listening-recording head at the proper time for a message.

It will be understood from the foregoing description of the operation of a function control unit 200 during a listening cycle that because of equipment malfunction or operating error, there may be some occasions on which the pulse count in the listening memory 274 does not equal the pulse count in the recording memory 269 before the listening-recording head 62 has traversed the entire length of a message track. As indicated above, the gate 272 provides an enabling voltage to the gate 277 when the count in the listening memory 274 is a predetermined maximum and when this predetermined maximum corresponds to the total length of a message track which is made available on the message drum 10, the gate 272 will insure that a control pulse P-3 occurs when the listening-recording head 62 has traversed the entire length of a message track regardless of whether the pulse count in the listening memory 274 equals the pulse count in the recording memory 269.

The gate 273 and additional features of the function control unit 200 can be further understood by considering the operation of the function control unit 200 during a recording cycle provided by the multi-message announcing system. As described above and shown in FIG. 6, the seize relay 150 provides an operating voltage by the connector 101 to the function control unit 200 when the recording line A has been connected by the central office equipment 90 to the trunk C for the purpose of recording a new message on the message drum 10. Within the function control unit 200, this operating voltage provides an enabling voltage for a gate 260. This enabling voltage serves to make gate 260 responsive to the control pulses P-3 which are applied to the gate 260 from the gate 277 by the connector 205, a connector 200, and a connector 201. Thus, when the seize relay 150 is operative, the gate 260 provides a trigger pulse by a connector 249 to a two-pulse counter 261 in response to a control pulse P-3 which occurs when a listening cycle has been completed.

The two-pulse counter 261 is a conventional two-pulse counter and after two trigger pulses from the gate 260, the two-pulse counter 261 applies an inhibiting voltage to the gate 260 by a connector 450 which stops the response of the gate 260 to control pulses P-3. However, after two trigger pulses from the gate 260, the two-pulse counter 261 provides an enabling voltage by connectors 248 and 297 to a gate 262 and by connectors 248 and 246 to gate 263.

It will be recalled from the description of FIG. 6 that upon the seize relay 150 becoming initially operative, the trunk C is initially connected by the selector switch 155 to the listening amplifier 154. As will be described below, the operation of the selector switch 155 to disconnect the trunk C from the listening amplifier 154 and connect it to the recording amplifier 156 cannot occur until the two-pulse counter 261 applies the enabling voltage described above to the gate 263. Accordingly, it will be understood that the gate 260 and the two-pulse counter 261 serve to maintain a recording line B connected to the listening amplifier 154 throughout at least one entire listening cycle and that portion of the immediately previous listening cycle which follows the seize relay 150 becoming operative. This allows the message on a message track to be heard before it is replaced with a new message.

As indicated above, after the occurrence of two control pulses P-3, the two-pulse counter 261 provides an enabling voltage to the gate 262 which causes the gate 262 to provide a voltage pulse in response to a trigger pulse provided from the gate 280 by connectors 230 and 232. It will be recalled from the description above of a listening cycle that the gate 280 provides a trigger pulse which occurs at least two clock pulses P-1 after the head disengaging voltage DP-3 and which corresponds to the occurrence of a synchronizing pulse P-2 from the master timer 300. Thus, when the gate 262 provides a voltage pulse in response to a trigger pulse from the gate 280, the voltage pulse occurs after at least one complete listening cycle has occurred, after the listening recording head has had adequate time to fall from a raised position, and when the listening-recording head is radially positioned relative to the message drum so that it is at the beginning of a message track.

The voltage pulse from the gate 262 is applied to the recording memory 269 by a connector 294 and a connector 296. This voltage pulse serves to reset the pulse count in the recording memory 269 to zero. The voltage pulse from the gate 262 is also applied to an erase control circuit 264 by connectors 294 and 295. In response to the voltage pulse, the erase control circuit 264 provides a second enabling voltage to the gate 263 by connector 243.

In response to the enabling voltage from the erase control circuit 264 and the simultaneous enabling voltage from the two-pulse counter 261, the gate 263 provides an enabling voltage by connectors 241 and 240 to a gate 266, and by connectors 241 and 242 to a gate 265. In addition, by a connector 241 and the connector 104, the gate 263 provides a voltage output to the selector switch 155 which causes the selector switch 155 to connect the connector 107 and the recording trunk C to the connector 110 and the recording amplifier 156 rather than to the connector 109 and the listening amplifier 154.

When the gate 266 is enabled by the enabling voltage from the gate 263, the gate 266 provides a voltage pulse by the conductor 103 to the TB relay 153 in response to a trigger pulse from the gate 271. This trigger pulse is applied to the gate 271 by a connector 238 and it will be recalled that the gate 271 provides a trigger pulse each time the pulse count in the listening memory 274 is reset to zero by a voltage pulse from the gate 280. Thus, a voltage pulse is applied to the TB relay 153 from the gate 166 when the pulse count in the listening memory 274 is reset to zero at the beginning of a message track on the message drum.

The voltage pulse to the TB relay 153 from the gate 266 causes the TB relay 153 to apply an audio frequency from the tone source 152 as a tone burst to the connector 106 and ultimately to the recording trunk B and the station ST. This tone burst serves as a signal that the recording of a new message on the message track may be initiated.

In response to the enabling voltage from the gte 263, the gate 265 becomes responsive to the clock pulse P-1 which is applied to the gate 265 by a connnector 245, a unit absorbing circuit 267, a conductor 237, a conductor 234, and the conductor S from the master timer 300. In response to a control voltage from the gate 265 by a connector 293 when the enabling voltage from the gate 263 is applied to the gate 265, the unit absorbing circuit 267 absorbs the first clock pulse P-1 from the master timer 300 but permits all subsequent clock pulses P-1 to pass by the connector 245 to the gate 265 and causes a series of voltage pulses from the gate 265 to the recording memory 269 by a connector 244.

The purpose of the unit absorbing circuit 267 gate to make the length of the message being recorded, as indicated by the pulse count in the recording memory 269, one less voltage pulse in length than its actual length. This serves 224, insure that the length of time during which the message is subsequently provided to a subscriber line A during a message cycle is not sufficient in length for the opening of the switch Z or random noise related to the termination of the recording of the message to be heard as part of the message.

At this point it will be understood that the operation of the function control unit 200 during a recording cycle is such that a recording line B receives the previously recorded message for at least the duration of one message cycle and then, when the listening-recording head is properly positioned relative to the beginning of a message track, the pulse count in the recording memory 269 is reset to zero and the recording line B receives a tone burst and is connected to the recording amplifier 156 rather than to the listening amplifier 154 for the recording of a new message. In addition, the erase control circuit 264 provides a voltage output by the connector 105 to the bias oscillator 157 in response to the voltage pulse from the gate 262. Thus, the erasing head is made operative to erase the previous message as a new message is being recorded.

As indicated above in describing FIG. 6, when a new message has been recorded, the momentary opening of the switch Z at the station ST in the recording line B causes the seize relay 150 to become momentarily inoperative. The resulting reset voltage pulse from the seize relay 150 is applied by the connector 102 to the two-pulse counter 261 and causes the termination of the enabling voltage to the gates 262 and 263 from the two-pulse counter 261. The termination of the enabling voltage to the gate 263 causes the enabling voltage from the gate 263 to the gate 265 to terminate and as a result the further input of voltage pulses to the recording memory 269 in response to clock pulses P-1 is terminated.

It will be understood that the listening memory 274 has been simultaneously counting upwardly with the recording memory 269 because the clock pulses P-1 have been applied to the gate 278 as described above in describing a listening cycle even though there are no subscriber lines A connected to the listening-recording head. The comparator 270 provides an enabling voltage to the gate 275 by the connector 211 when the pulse count in the listening memory 274 is greater than the pulse count in the recording memory 296 and since the unit absorbing circuit 267 has absorbed one clock pulse, the comparator 270 has been provided an enabling voltage to the gate 275 while the new message was being recorded.

In response to this enabling pulse from the comparator 270, the gate 275 has been providing an enabling pulse to the gate 276. However, the response of the gate 276 to an enabling voltage from the gate 275 is inhibited by the inhibiting voltage from the gate 273 until the pulse count in the listening memory 274 has reached that pulse count at which the message being recorded, in terms of the actual message or the carrier frequency from the erasing amplifier 158, has reached a length which will prevent the voice signal device 400*b* from being made operative when the message is used in a message cycle.

In addition, the response of the gate 276 to an enabling voltage from the gate 275 is also inhibited by the inhibiting voltage from the erase control circuit 264 until such time as the erase control circuit 264 is reset. Thus, even though the comparator 270 is providing an enabling voltage which would normally result in a control pulse P-3 from the gate 277, no control pulse P-3 is provided from the gate 277. Rather, it is not until the listening memory 274 has a pulse count corresponding to the total length of the message track that the gate 277 provides a control pulse P-3 in response to an enabling voltage from the gate 272.

This control pulse P-3 is applied to the erase control crcuit 264 by connectors 205, 200, and 203 to reset the erase control circuit 264. It will be understood that the inhibiting of a control pulse P-3 and of the resetting of the erase control circuit 264 until the gate 272 provides an enabling voltage at the end of the message track result in the erasing head 65 being maintained in operative position and in the bias oscillator 157 being operative until the end of the message track is reached. This insures that the old message is erased regardless of the length of the new message. It will also be understood that upon the resetting of the erase control circuit 264, the inhibiting voltage applied to the gate 276 from the erase control circuit 264 is removed and the function control unit 200 will operate in a listening cycle as described above to provide the new message to subscriber lines A or in a listening cycle followed by a recording cycle if the new message is to be checked or replaced by still another new message in the manner described above.

MASTER TIMER

The master timer 300 which provides the clock pulses P-1 and the synchronizing pulse P-2 which are utilized by a channel control unit U in the manner described above is best seen in FIG. 8. From FIG. 8 it will be seen that the master timer 300 includes a rectifier 303 to which the output of an alternating current source is provided by a connector 93, a pulse generator 302 by which the rectified output of the rectifier 303 is converted into a pulse output, and a frequency divider 301 which serves to provide a series of pulses having a predetermined frequency of occurrence.

The rectifier 303, pulse generator 302 and the frequency divider 301 are conventional in nature and are arranged to provide clock pulses P-1 at a connector 370 which are spaced in time by that interval of time which is required for the reference marker, such as the magnet 28, on the message drum 10 to pass from a position corresponding to one listening-recording head 62 to the position corresponding to the subsequent listening-recording head 62. Thus, the clock pulses P-1 provided at connector 370 from the frequency divider 301 correspond in time of occurrence to the reference mark on the message drum being in those positions which correspond to the positions of the various listening-recording heads around the message drum.

To insure exact coincidence between the times of occurrence of the clock pulses P-1 and the positions of the reference mark on the message drum relative to the various listening-recording heads, the master timer 300 includes a pulse generator 304 which is connected by the connector 92 to the drum switch 30 and which provides a reference pulse by connectors 350 and 351 to the frequency divider 301 in response to the reference mark 28 on the message drum passing the drum switch 30. This reference pulse from the pulse generator 304 serves to insure that the clock pulses P-1 from the frequency divider 301 stay synchronized with the positions of reference mark on the message drum relative to listening-recording heads.

Figure 8:
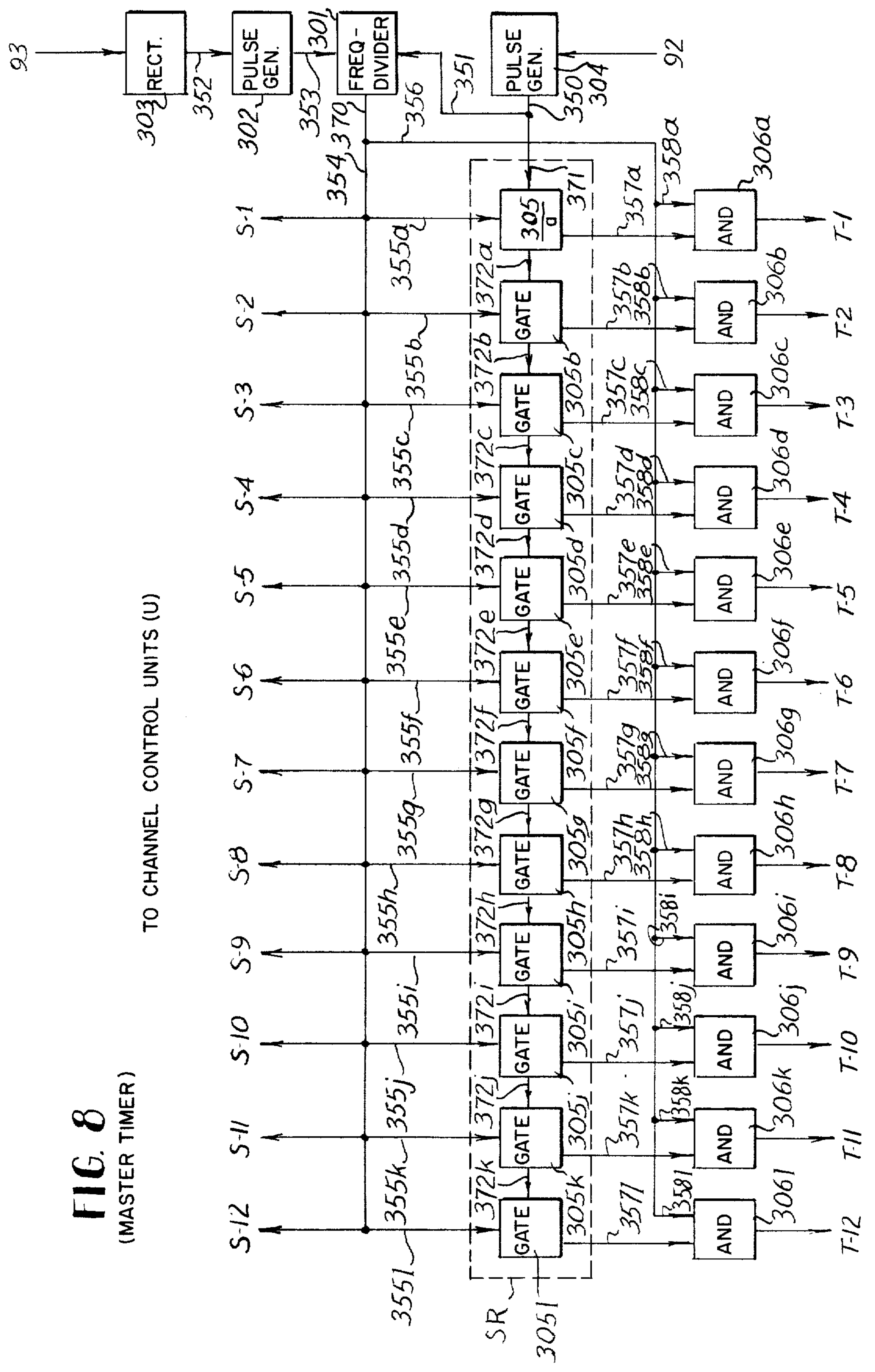

The clock pulse P-1 from the frequency divider 301 is provided simultaneously to all of the channel control units U by the connector 354 and the connectors S as indicated in FIG. 8. Within the master timer 300, the clock pulses P-1 from the frequency divider 301 are also provided simultaneously to each of the gates 305 in a shift register SR by connectors 370, 354 and 355.

The reference pulse from the pulse generator 304 in response to the reference mark on the message drum is also provided by the connector 350 and 371 to the first gate 305*a* in the shift register SR as shown in FIG. 8. Thus, the gate 305*a* provides a synchronizing pulse P-2 at the connector 357*a* when the reference mark on the message drum passes the drum switch 30. At the same moment, the gate 305*a* provides a trigger pulse to the gate 305*b* and upon the next occurrence of a clock pulse P-1 from the frequency divider 301, the gate 305*b* provides a synchronizing pulse P-2 on the connector 357*b*.

It will be understood that the synchronizing pulse P-2 on the connector 357*a*and the synchronizing pulse P-2 on the connector 357*b* are separated by an interval of time which corresponds to the length of time that is required for the reference mark 28 on the message drum to move from the radial position of one listening-recording head to the radial position of the succeeding listening-recording head. Thus, the synchronizing pulses P-2 from the shift register SR on the connectors 357 occur at times suitable for these synchronizing pulses P-2 to be used in the channel control units U. However, since the waveform of the clock pulses P-1 from the frequency divider 301 is substantially that of W-1 in FIG. 11, since the waveform of the synchronizing pulse P-2 from each of the gates 305 is substantially that of W-2 in FIG. 11, and since a less broad pulse will enhance the reponse to a channel control unit U to a synchronzing pulse P-2, the master timer 300 includes additional gates 306 to which the voltage pulses from the gates 305 are applied along with the clock pulses from the frequency divider 301. The result is a synchronizing pulse P-2 which has a waveform substantially that of W-3 in FIG. 11 and which serves as a synchronizing pulse P-2 in each of the channel control units U.

It will now be understood that a single reference mark on the message drum serves to provide a synchronizing pulse P-2 to the various channel control units U by which the operation of the channel control unit U is properly coordinated with other channel control units U and with the position of a listening-recording head relative to a message track on the message drum. However, it will be further understood that the coordinating of the channel control units U by the synchronizing pulses P-2 provided by the master timer 300 permits a variety of arrangements of uses of message tracks on the message drum simply by varying the particular channel control unit U to which a particular synchronizing pulse P-2 is applied.

Figure 9:
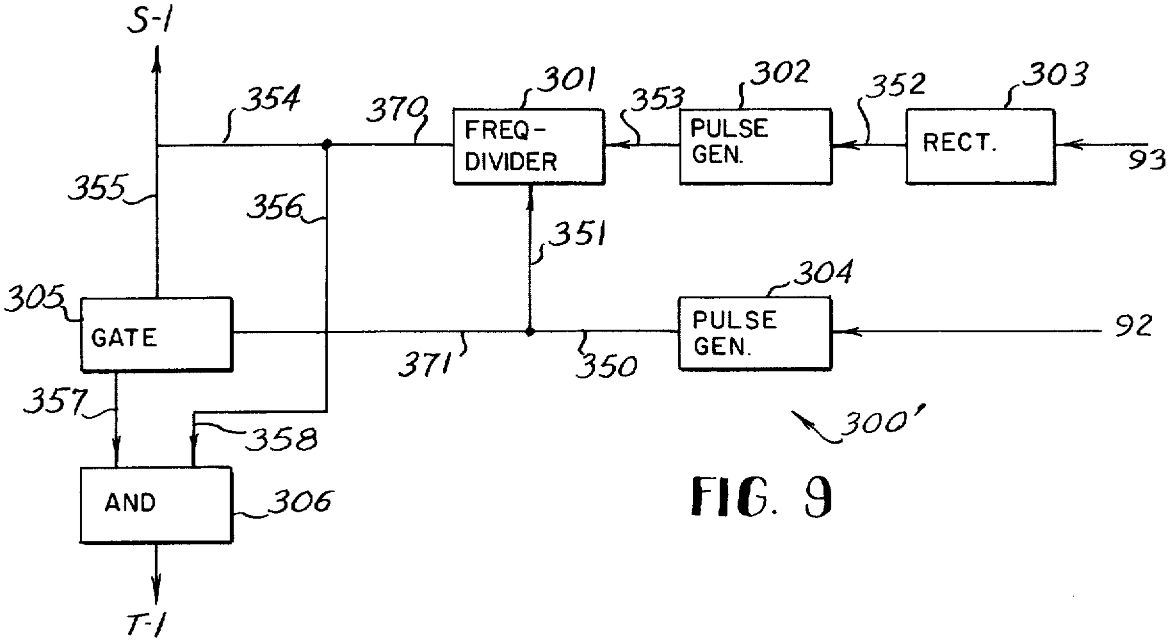

It will be further understood that if there is a requirement for only one message track or for all channel control units U to control the functions controlled by them simultaneously because of an arrangement of the listening-recording heads relative to the message drum, master timer 300 may be simply the master timer 300' shown in FIG. 9. From an examination of FIG. 9, it will be seen that this master timer 300' simply provides clock pulses P-1 in the same manner as the master timer 300 shown in FIG. 8 and that it differs from the master timer 300 shown in FIG. 8 only in that it provides only a single synchronizing pulse P-2 which may be applied to a single channel control unit U or to all channel control units U simultaneously. These and other features and advantages of the multi-message announcing system disclosed herein will be better understood from the following description of the operation of the system.

OPERATION

From the foregoing description, the operation of the apparatus and control circuitry of the present invention should now be understandable.

Assuming first that the equipment has just been installed and there is no message recorded on the message drum 10, the first step would be to operate the recording station by closing the switch Z which will cause the central office equipment 90 to provide a busy signal to subscriber lines and connect the recording line B to the listening amplifier 154. At the appropriate start pulse from function control unit 200, there will be a head engaging voltage EP-3 which will cause the appropriate solenoid 38 to be energized to rotate the sleeve 32 and urge a head assembly 51 against a message track MT of the message drum 10. The apparatus will then go through the motions of playing back the recorded message; however, since there is no message on the message track MT, this section will continue until the listening time is equal to the predetermined maximum. This will be the same condition as if the previously recorded message had been played in its entirety so that there will be a tone burst from the tone source 152 to indicate to the person that the apparatus is ready to receive a message for recording. The message will then be dictated into the recording station which will place the appropriate signal on the listening-recording head 55 so that the message will be recorded on a particular message track MT of the message drum 10. It will be of course realized that the erase head 65 has also been energized to erase the same message track immediately ahead of the listening-recording head 62.

It should be realized that the motor 16 will run continuously so that the worm 18 will constantly drive the worm gear 19 to cause rotation of the drive wheel 21 and the drive spindle 15; therefore, the message drum 10 will be constantly rotating as will be the timing wheel 25. Thus, when the control circuitry is actuated to cause one of the head assemblies 51 to be urged against the message drum 10, the drum 10 will already by rotating for appropriate listening or recording as determined by the control circuitry.

When a solenoid 38 is energized, its shaft 40 will be rotated to cause rotation of the crank 39 to rotate bell crank 42 and thereby cause rotation of a sleeve 32. As the sleeve 32 rotates, the slide assembly 75 will also be rotated to urge the half-nut 36 against the threaded portion 22 of the drive wheel 21 which, it will be remembered, is rotating. As a result, when the half-nut 36 is urged against the threaded portion 22 of the drive wheel 21 the half-nut 36 will be urged up by the interconnection of the mating threads of the half-nut 36 and the threaded portion 22 of the drive wheel 21 so that the sleeve 32 will gradually and uniformly be moved up.

Simultaneously with the rotation of the sleeve 32 and the engagement of the half-nut 36, the head assembly 51 is carried by the sleeve 32 to be rotated and urged against the drum 10. Rotation of the sleeve 32 will cause rotation of the collar 52 of the head assembly 51, and this will carry the arm 53 that is attached to the collar 52. Since the listening-recording head arm 55 and the erase head arm 54 are attached to the arm 53 by means of the pin 58, all three of these arms will be moved towards the drum 10. The parts are so arranged that the listening-recording head 62 and the erase head 65 will contact the recording surface of the drum before the arm 53 completes its travel; therefore, the pin 68 will not be against the outer end of the arm 53 so that the arms 54 and 55 will be urged against the drum 10 only through the force of the springs 69 and 66 respectively.

As the sleeve 32 is moved up as previously described, the head assembly 55 carried thereby will also be moved up to traverse a particular message track MT of the message drum 10. Since the message drum 10 is continuously rotating, and the head assembly 55 is moved up, the path actually traced on the message drum 10 will be a helix, thus providing a considerable path length available for the recording.

When the message to be recorded has been completed, the person will momentarily close the switch Z which will cause a repeat of the playback as described. If the dictator is not satisfied with the message as recorded, he can simply hold the line until he again receives the tone burst and he can re-record his message.

When the proper message has been recorded on the message drum 10, the dictator will open the switch Z which will cause the central office equipment 90 to disconnect the recording line B from the apparatus and to remove the busy signals from the subscriber lines. The function control unit 200 will provide a pulse to de-energize the solenoid 38; and, when the solenoid 38 is de-energized the shaft 40 will be rotated in the opposite direction to cause the sleeve 32 also to be rotated in the opposite direction carrying with it the slide assembly 75. When the slide assembly 75 is rotated, the half-nut 36 will be disengaged from the threaded portion 22 of the drive wheel 21 so that there is then nothing supporting the sleeve 32 and its attached equipment in its raised position. The sleeve 32 will therefore fall by gravity to return to its lowermost position. It is contemplated that the lower housing of the apparatus will be filled with oil which will serve the double function of keeping the gears 18 and 19 lubricated and also to act as a dash pot as the sleeve 32 along with the half-nut 36 falls. The fall will therefore be dampened to prevent injury to the various equipment.

The above procedure would be repeated for each of the separate message tracks until the appropriate message has been recorded on all 12 of the message tracks. The apparatus is then ready to receive calls from subscribers and play the selected message to the subscriber.

A subscriber who desired to hear one of the recorded messages would first seize a subscriber line and contact the recording unit through the central office equipment 90. If there is not a busy signal on the subscriber line, the function control unit 200 would provide a CT pulse which would cause the subscriber line to be connected to the listening amplifier 154. The function control unit 200 would also provide a start pulse in response to a clock pulse so that the appropriate solenoid 38 will be energized when the corresponding listening-recording head 62 is at the beginning of the recorded message on the message track. The recorded message would then be played back through the listening amplifier 154 and through the subscriber line such as a subscriber line A-1, and this playback would continue until the listening time is equal to the recording time for the particular message to which the subscriber is listening. When these times are equal, there will be a pulse to deenergize the solenoid 38 and also a CO pulse to cause the central office equiment 90 to disconnect the subscriber line from the announcing system.

It will be remembered that the recording time is automatically forshortened during recording so that the indication is slightly less than the actual recording time; therefore, the listening time preceding the CO pulse will in fact be slightly less than the actual recording time at the time the recording was made. The difference in the two times is sufficient to prevent the subscriber from hearing extraneous noises caused by the termination of the recording station.

It will be understood from the foregoing that synchronization of the entire device is maintained and assured by the synchronizing means. Since the function control unit 200 has its various components operated by means of the clock pulses, and the clock pulses are kept in proper time relation by the drum switch 30 which is mechanically related to the radial positions of the head assemblies 55, it is assured that the recording cycles and listening cycles as well as the erasing will coincide for any message that is recorded on a message track MT of the message drum 10.

It will of course be realized by those skilled in the art that the particular embodiment of the invention here chosen is by way of illustration only, and numerous changes and modifications may be made, and the full use of equivalents resorted to without departing from the scope of the invention as defined by the appended claims.

We claim:

1. In a message announcing system, a first message medium for storing a first message, a first message announcing means operative in response to a first operating signal to provide a message output in response to said first message, a second message medium for storing a second message, a second message announcing means operative in response to a second operating signal to provide a message output in response to said second message, a motion means for continuously moving both said first message medium and said second message medium relative to both said first message announcing means and said second message announcing means, a control means operative to provide a first control signal at a first predetermined time in response to said first message medium and said first message announcing means having a predetermined position relative to each other, and also operative to provide a second control signal at a second predetermined time in response to said second message medium and said second message announcing means having a predetermined position relative to each other, and operating means connected to be responsive to said first and second control signals and also responsive to a first message signal and a second message signal, said operating means being operative to supply said first operating signal to said first message announcing means in response to the occurrence of both said first control signal and said first message signal, and being operative to supply said second operating signal to said second message announcing means in response to the occurrence of both said second control signal and said second message signal.

2. Message announcing system as in claim 1, wherein:

said first message medium and said second message medium comprise first and second message tracks on a recording medium, each of said message tracks having a certain maximum length to receive a recorded message of corresponding maximum duration;

recording means selectively operative to record on at least one of said message tracks a message which may be any of a plurality of different lengths not to exceed said maximum duration;

record indicating means responsive to the recording of said message by said recording means to provide a record signal condition corresponding to the actual length of said recorded message;

message delivery indicating means responsive to the said operating signal for the said message announcing means associated with said one message track to provide a delivery signal condition corresponding to the length of message output provided by such message announcing means; and means responsive to said record signal condition and to said delivery signal condition and operative to terminate operation of said message announcing means when the length of message delivery corresponds to said actual length of said recorded message.

3. Message announcing system as in claim 2, further comprising:

erasing means selectively operative to erase a previously recorded message from said one message track;

erase control means responsive to a record signal condition to cause said recording means and said erasing means to become operative simultaneously for replacing a previously recorded message with a new message; and said erase control means operative in response to termination of said record control condition to immediately cause said recording means to become inoperative and to cause said erasing means to become inoperative at the conclusion of an erase time sufficient for erasure of a previously recorded message of said maximum duration.

4. Message announcing system as in claim 1, wherein:

said first message medium and said second message medium comprise helical tracks on a rotating message drum operatively connected for rotation by said motion means;

said message announcing means are angularly spaced around said message drum and are selectively engageable in message transducing relation with a corresponding helical track in response to a said operating signal;

said control means comprises timing means operative in response to rotation of said message drum to provide a said control signal in response to each occurrence of a particular rotational position of said message drum; and each of said rotational positions bears a predetermined relationship to one of said angular spacings and to the starting point of a corresponding said helical track.

5. Message announcing system as in claim 4, wherein:

said message announcing means are of a plurality of message announcing means which are equally spaced angularly around said message drum;

said timing means includes a source of pulses which occur at intervals of time corresponding to the time required for a reference location on said message drum to pass between the angular positions of two adjacent message announcing means; and synchronizing switch means responsive to rotation of a said reference location of said message drum past a particular one of said message announcing means to provide said pulse source with a pulse synchronizing signal for each revolution of said message drum.

6. Message announcing system as in claim 4, wherein:

each of said message announcing means includes a support member supported at said angularly spaced location in parallel relation to the rotational axis of said message drum, each said member being selectively axially movable adjacent said message drum;

drive means mounted for rotation with said message drum and having threaded means;

each of said support members having thread engaging means selectively movable into engagement with said threaded means to axially move said support member; and transducer means supported on each said support member for selective message transducing engagement with a helical track on said message drum.

7. Message announcing system as in claim 6, further comprising:

means for rotating each of said support members in a first direction for engagement of said transducer means with said message drum and in a second direction for disengagement of said transducer means from said message drum;

each said transducer means includes a first head, a second head, and positioning means for positioning the first and second heads in predetermined relation to each other on the corresponding helical track of said message drum;

said positioning means including a first support means for supporting said first head by a first arm extending in the line of motion of said first head relative to said recording medium;

a second support means for supporting said second head by a second arm extending parallel to said first arm and beyond said first arm to place said second head in said line of motion; and said first arm and said second arm being pivotable about a common pivot point on said positioning means.

8. Message announcing system as in claim 6, wherein:

said message drum is mounted for rotation about a vertical axis, and said threaded means and each of said thread engaging means are pitched to selectively move the respective said support means upwardly in response to engagement of a thread engaging means with said threaded member; and each said support member is supported for return by gravity to a lowermost position relative to said message drum, in response to disengagement of said thread engaging means.

9. Message announcing system as in claim 8, further comprising oil damping means associated with each of said support members to control the rate of said gravity return.

10. In a message announcing system; a rotating message drum having an axis of rotation and a surface; a recording means for recording a message on said surface in each of a plurality of helical message tracks displaced from each other along said axis of rotation; a plurality of message responsive means in message transducing relation with respective ones of said helical message tracks and separately and selectively operative for providing message outputs in response to messages recorded on said surface of said drum, each of said message responsive means having message enabling means which is separately and individually selectively operative to provide said respective message outputs, each of said message responsive means having a position adjacent said surface which corresponds to the position of one of said helical message tracks along said axis of rotation and which is displaced angularly from the positions of others of said message responsive means; a control means responsive to rotation of said drum to provide a drum position signal condition corresponding to the rotational position of said drum, said control means including first means responsive to a drum position signal condition corresponding to a predetermined rotational position of said drum and to the concurrent presence of a first message signal for causing one of said enabling means to be operative when said drum is in a first rotational position, and including second means responsive to a drum position signal condition corresponding to a predetermined second rotational position of said drum and to the concurrent presence of a second message signal for causing another of said message enabling means to be operative when said drum is in a second rotational position.

* * * * *